Patented Aug. 2, 1949

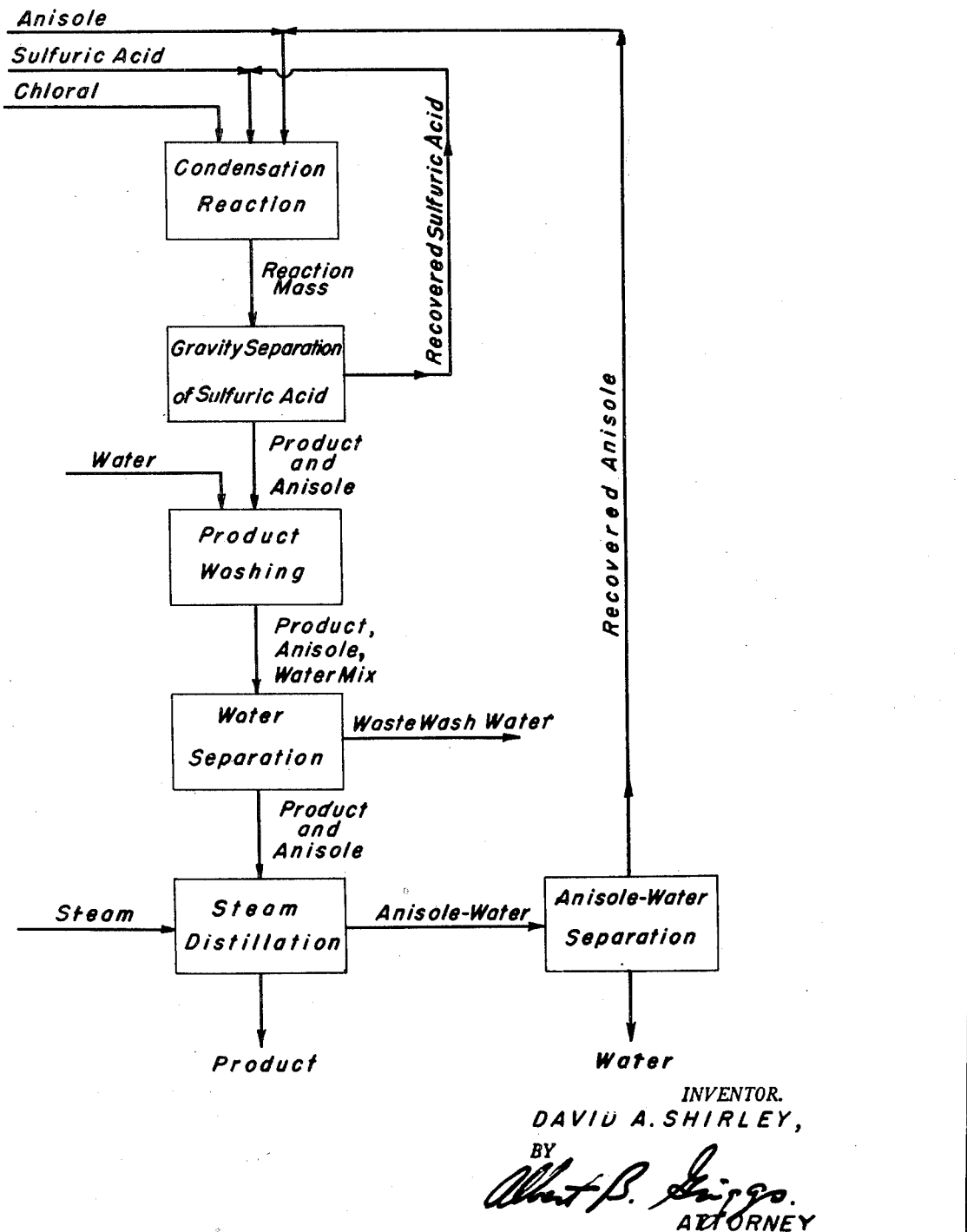

2,477,665

UNITED STATES PATENT OFFICE 2,477,665

PROCESS FOR PREPARING 2,2-BIS-(4 METHOXYPHENYL)-1,1,1-TRICHLOROETHANE

David A. Shirley, Wilmington, Del., assignor to E. I. du Pont de Nemours & Company, Wilmington, Del., a corporation of Delaware Application August 1, 1946, Serial No. 687,610

4 Claims. (Cl. 260—613)

This invention relates to the manufacture of 2,2-bis-(4-methoxyphenyl)-1,1,1-trichloroethane. It is more particularly directed to processes comprising the steps of mixing anisole, chloral, and about 95 to 98 per cent sulfuric acid to form a liquid reacting system while simultaneously agitating and cooling the system to maintain its temperature below about 20° C. whereby there is obtained at the completion of the mixing a reaction mass composed of an organic phase containing the product 2,2-bis-(4-methoxyphenyl)-1,1,1-trichloroethane and an acid phase consisting substantially of sulfuric acid, water, and a small amount of sulfonated anisole, separating the organic phase, and recovering therefrom the product.

It is an object of this invention to provide processes which are economical and suitable for the commercial manufacture of 2,2-bis-(4-methoxyphenyl)-1,1,1-trichloroethane in high yield. Another object is to provide processes in which anisole and chloral are condensed with the aid of an inexpensive condensing agent. A further object is to make available processes for the condensation of anisole and chloral with sulfuric acid in the absence of other agents without causing appreciable sulfonation of anisole. It is a still further object to provide processes in which chemicals other than the reactants chloral, anisole, and sulfuric acid need not be employed. Still further objects will become apparent hereinafter.

The foregoing and other objects of the invention are attained by bringing together anisole, chloral, and sulfuric acid of about 95 to about 98 per cent strength to form a liquid reacting system and while so bringing the reactants together cooling the system to maintain its temperature below about 20° C. There is thus obtained a mixture of acid and organic phases. These may be separated and the product 2,2-bis-(4-methoxyphenyl)-1,1,1-trichloroethane recovered from the organic phase. It is to be noted that the reacting system consists substantially of anisole, chloral, and sulfuric acid and the products of reaction of these ingredients, other organic or inorganic liquid materials being absent.

In the drawing there is a flowsheet illustrating a process of this invention. The discussion of the invention which follows may be more readily understood by reference to the drawing.

According to this invention, I first mix anisole, chloral, and sulfuric acid of about 95 to 98 per cent strength at a temperature below about 20° C. to effect condensation of anisole and chloral to yield the product 2,2-bis-(4-methoxyphenyl)-1,1,1-trichloroethane.

In a preferred method for bringing the reactants together, the anisole and chloral are first mixed and cooled to below 20° C., then while agitating this mix and cooling to maintain the temperature below 20° C., the sulfuric acid is gradually added. The sulfuric acid addition should be made as rapidly as possible consistent with the requirement that the temperature of the reacting system be kept below about 20° C.

Alternatively, the three ingredients may be brought together simultaneously provided always, of course, that the mixture of the three is maintained at a temperature below 20° C. during the condensation reaction. The chloral may also be added to a mixture of anisole and sulfuric acid but this is a less desirable procedure because it provides an extended period of contact of anisole and sulfuric acid and sulfonation of anisole is greater than that resulting from use of the preferred method described above.

The proportions in which the raw materials are mixed may be varied, the principal limiting requirement being that they be used in such proportions that the resulting mixture remains substantially in a liquid phase and is easily stirred thruout the reaction cycle. In other words, the reactants are mixed in the proportions which form a liquid reacting system.

It has been found that a liquid reacting system is obtained and the advantages of the processes of this invention are most fully realized when the reactants are used in the proportions of at least 3 moles each of anisole and about 95 to 98 per cent sulfuric acid for each mole of chloral and more particularly when the proportions are maintained at about 3 to 5 moles each of anisole and about 95 to 98 per cent sulfuric acid for each mole of chloral.

The sulfuric acid used in the methods of this invention may be the commercially available 95 to 98 per cent sulfuric acid, or, if desired, a more refined acid of this strength. Also, as shown in the drawing, the sulfuric acid may be a mixture of acid recovered in a subsequent step in the process, which will be more fully set out hereinafter, and fresh sulfuric acid. The use of this recovered or recycle sulfuric acid is particularly preferred and various benefits and economies result from its use. The recycle acid is, however, usually below 95 per cent in concentration and must be fortified with stronger, fresh sulfuric acid or oleum as required to provide the necessary amount of sulfuric acid of about 95 to 98 per cent strength for mixture with anisole and chloral.

As has been set out above, it is essential that the step of mixing anisole, chloral, and sulfuric acid and the resulting condensation reaction be effected at a temperature below about 20° C. in order that the benefits of the invention be fully realized. It will be understood, of course, that somewhat higher temperatures may be employed and the reaction will proceed satisfactorily and the product 2,2-bis-(4-methoxyphenyl)-1,1,1-trichloroethane can be obtained under such conditions, but such a method of operation is generally less desirable because the rate of sulfonation of anisole increases very markedly at temperatures in excess of about 20° C. Temperatures considerably below 20° C., even down as low as −5° C. or even lower, may be employed satisfactorily but for best results it is preferred that the liquid reacting system be maintained at a temperature of about 10 to 20° C.

After having mixed chloral, anisole, and sulfuric acid to form a liquid reacting system and condensing the chloral and anisole while maintaining the temperature of the system below about 20° C., as above set out, there is obtained a reaction mass composed of an organic phase containing the product and when an excess of anisole has been employed containing additionally unused anisole, and an acid phase consisting substantially of sulfuric acid, water, and a small amount of sulfonated anisole. These two phases are then separated.

The separation of the organic and acid phases resulting from the condensation reaction is preferably one utilizing gravity. Thus according to a preferred embodiment of the invention the reaction mass is introduced into a centrifuge of the type suitable for separating immiscible liquids and the two phases are separated. Alternatively, the reaction mass may be left in a quiescent condition whereby the phases will separate into two layers, the sulfuric acid phase being the heavier.

If the separation is made by leaving the reaction mass quiescent, it is preferred that the temperature of the reaction mass be kept below about 20° C. until the separation step is completed although moderate heating of the reaction mass is permissible and increases the rate of phase separation, but the subsequent recovery of uncondensed anisole is decreased when higher temperature is used in effecting the separation.

Generally speaking, the best results are obtained when the condensation reaction is effected as rapidly as possible consistent with maintaining the temperature below about 20° C. and preferably from 10 to 20° C. and when the subsequent separation step is effected rapidly as by centrifuging the reaction mass in order that sulfuric acid and anisole be in contact with each other as short a time as possible.

The acid phase obtained after separation from the organic phase consists of a diluted sulfuric acid of a concentration generally from about 89 to 92 per cent. This sulfuric acid phase is suitable for re-use in the condensation reaction provided, of course, it is fortified with stronger sulfuric acid to increase the acid strength to about 95 to 98 per cent. In carrying out such recycle operation, a substantial portion of the recovered sulfuric acid is recycled although not all the acid is so used, for to recycle all the acid continually would effect a constant increase in the amount of acid employed in the condensation reaction. Accordingly, a portion of the recovered sulfuric acid is withdrawn from the operation following gravity separation.

The product phase recovered from the reaction mass is contaminated with sulfuric acid. In order to obtain a satisfactory product, the organic phase is then subjected to washing or scrubbing with water or dilute ammonia in the next step of the process. This operation is readily carried out by adding water to the organic phase and agitating the mixture for a short period, then stopping agitation and permitting the water and organic phases to separate and withdrawing the waste wash liquor. The washing step may be repeated as required to remove sulfuric acid from the organic phase. Usually three or four successive washings are ample to effect substantially complete removal of sulfuric acid from the organic phase.

The washed organic phase is then subjected to steam distillation. Unreacted anisole, which in the process of this invention is carried thru the various steps to this point, is readily removed along with the water vapor. In this steam distillation operation, it is advantageous to use vacuum while passing steam into the organic phase particularly near the end of the distillation step in order to effect removal of the last traces of anisole and water.

The anisole-water mix recovered in the steam distillation step is readily separated by gravity separation and the recovered anisole may then be returned as recycle anisole for mixture with fresh anisole for use in the condensation reaction.

There remains in the still at the completion of the steam distillation step liquid product 2,2-bis-(4-methoxyphenyl)-1,1,1-trichloroethane. This liquid product may be processed by various methods to obtain the solid product either as a crude or refined material. For example, the molten product may be cast and solidified in blocks or in thin sheets which may subsequently be pulverized. Alternatively, it may be granulated by agitating the molten material in suitable granulating mills while cooling to a temperature below the melting point of the product or by dispersion in a liquid followed by cooling to a temperature below the melting point of the product. The crude molten product may be further refined by crystallization from organic solvents.

The 2,2-bis-(4-methoxyphenyl)-1,1,1-trichloroethane prepared according to the processes set out above is a light yellow-colored solid having a melting point between about 76° and about 87° C., depending upon the exact conditions of the reaction and subsequent processing technique and the quality of the reactants. By recrystallization of this product from such solvents as methanol, ethanol, petroleum, ether, and benzene, a pure white crystalline product melting at 89° C. to 89.5° C. may be obtained.

According to the description set out above and in conformity with the flowsheet shown in the drawing, it will be seen that in a preferred embodiment of this invention 2,2-bis(4-methoxyphenyl)-1,1,1-trichloroethane is produced in a process comprising the steps of mixing anisole and chloral in the proportions of about 3 to 5 moles of anisole for each mole of chloral, said anisole consisting in part of recycle anisole, cooling the anisole-chloral mixture to about 10 to 20° C. while simultaneously agitating the mixture, cooling to maintain its temperature to about 10 to 20° C. and gradually adding to it a total of 3 to 5 moles of about 95 to 98 per cent sulfuric acid for each mole of chloral, said sulfuric acid consisting of recycle sulfuric acid fortified with stronger sulfuric acid to give acid of said strength, whereby there is obtained at the completion of the sulfuric acid addition a reaction mass composed of an organic phase consisting substantially of the product 2,2-bis-(4 - methoxyphenyl)-1,1,1-trichloroethane and unused anisole and an acid phase consisting substantially of sulfuric acid, water, and a small amount of sulfonated anisole, separating the organic phase from the acid phase by gravity separation, returning a substantial portion of the acid phase as the aforementioned recycle sulfuric acid, washing the organic phase with water after separation from the acid, separating the organic phase from the wash water, passing steam into the washed organic phase whereby unused anisole in the organic phase is removed by steam distillation and the product remains undistilled, separating from water the anisole recovered in the steam distillation step and returning the recovered anisole as the aforementioned recycle anisole.

An alternative but somewhat less attractive method for processing the reaction mass following the condensation reaction comprises the steps of adding the reaction mass to a large volume of water with agitation allowing the mass to separate into an organic layer and a dilute sulfuric acid layer, withdrawing the dilute acid layer, washing the organic layer with water or dilute ammonia several times to remove the sulfuric acid completely, then subjecting the organic layer to steam distillation to separate unused anisole from the product. It will be noted that this embodiment differs from the aforementioned preferred embodiment in the method employed in effecting separation of sulfuric acid from the reaction mass and that other steps in the process are substantially identical except, of course, that it is not practical to return the dilute recovered sulfuric acid for re-use in the condensation reaction.

The invention may be more fully understood by reference to the following examples.

Example 1

A mixture of 432 parts by weight of anisole and 148 parts by weight of chloral is made and cooled to about 15° C. by means of indirect brine cooling. While stirring this mixture and continually cooling to maintain the temperature between 10 and 20° C. there is added 400 parts by weight of 95.5 per cent sulfuric acid. The acid is added as rapidly as possible consistent with maintaining the temperature of the liquid reacting system between 10 and 20° C. About 45 minutes is required to add the sulfuric acid.

After completing addition of the sulfuric acid, the system is agitated for an additional 15 minutes. There is thus obtained a reaction mass consisting of two phases, one an organic phase containing the product and unused anisole, and the other an acid phase containing the sulfuric acid, water, and sulfonated anisole. These two phases are separated by centrifuging, the acid phase being held for use in a subsequent condensation reaction and the organic phase being washed or scrubbed with water then with a dilute ammonia solution and again with water. After separation of the washed organic phase, live steam is passed into it and there is recovered overhead an anisole-water mixture.

The steam distillation is continued until anisole ceases to be recovered and the still pot is evacuated toward the end of the steam distillation to aid in anisole removal. Steam distillation gives a recovery of 175 parts by weight of anisole which corresponds to about 81 per cent of the excess anisole employed.

The molten product remaining after steam distillation is cast and allowed to solidify. There is obtained 340 parts by weight of the product having a melting point at 78 to 82° C.

Example 2

One hundred and seventy-five (175) parts by weight of anisole recovered from the process of Example 1 is added to 257 parts by weight of fresh anisole and this mixture of recycle anisole and fresh anisole is then mixed with 158 parts by weight of choral. After cooling the anisole-chloral mixture to about 15° C., there is added as rapidly as possible with stirring and cooling to keep the temperature of the system between 10 and 20° C. a mixture of 400 parts by weight of about 96 per cent sulfuric acid. The acid so used is a mixture of 246 parts by weight of acid recovered following the condensation reaction carried out according to Example 1, and 154 parts by weight of 20 per cent oleum (104 per cent sulfuric acid). The steps of Example 1 are then duplicated in this example.

There is obtained 170 parts by weight of crude 2,2-bis-(4-methoxyphenyl)-1,1,1-trichloroethane having a melting point of 78 to 82° C. and 85 per cent of the excess anisole employed in the condensation reaction is recovered.

Example 3

A mixture of 216 parts by weight of anisole and 74 parts by weight of chloral is cooled to 15° C. and 200 parts by weight of 95 per cent sulfuric acid is added as rapidly as possible with stirring and maintenance of the temperature reaction mixture at 15±3° C. Thirty (30) minutes is required to add the sulfuric acid. The reaction mixture is stirred for an additional 15 minutes and then poured into 200 parts by weight of water. The resulting mixture is steam distilled. There is recovered 90 parts by weight of anisole. There remains in the distillation vessel an oil which is washed with hot water by decantation, leaving a molten product which is allowed to solidify. The resulting white solid weighs 170 parts by weight and melts at 78 to 82° C.

Example 4

Three hundred and ten (310) parts by weight of 95.5 per cent sulfuric acid is added at about 10° C. with stirring to a solution of 324 parts by weight of anisole and 147 parts by weight of chloral. The viscous liquid system obtained is stirred for approximately 15 minutes at the completion of the addition of the acid and is then added to about 300 parts by weight of water. After stirring, the aqueous phase is allowed to separate and is withdrawn and the organic layer is washed several times with hot water and then subjected to steam distillation to remove unused anisole. There is recovered 92 parts by weight of anisole and there remains undistilled 328 parts by weight of the product 2,2-bis-(4-methoxyphenyl)-1,1,1-trichloroethane.

I claim:

1. In a process for the manufacture of 2,2-bis-(4 - methoxyphenyl) - 1,1,1 - trichloroethane, the steps comprising mixing anisole, chloral, and about 95 to 98 per cent sulfuric acid in the proportions of at least 3 moles each of anisole and sulfuric acid for each mole of chloral to form a liquid reacting system while simultaneously agitating and cooling the system to maintain its temperature below about 20° C. whereby there is obtained at the completion of the mixing a reaction mass composed of an organic phase consisting substantially of the product 2,2-bis-(4-methoxyphenyl) - 1,1,1 - trichloroethane and unused anisole and an acid phase consisting substantially of sulfuric acid, water, and a small amount of sulfonated anisole, separating the organic phase from the acid phase by gravity separation, distilling the unreacted anisole from the organic phase whereby the product remains undistilled.

2. In a process for the manufacture of 2,2-bis-(4 - methoxyphenyl) - 1,1,1 - trichloroethane, the steps comprising mixing anisole, chloral, and about 95 to 98 per cent sulfuric acid in the proportions of about 3 to 5 moles each of anisole and sulfuric acid for each mole of chloral to form a liquid reacting system while simultaneously agitating and cooling the system to maintain its temperature at about 10 to 20° C. whereby there is obtained at the completion of the mixing a reaction mass composed of an organic phase consisting substantially of the product 2,2-bis-(4 - methoxyphenyl) - 1,1,1 - trichloroethane and unused anisole and an acid phase consisting substantially of sulfuric acid, water, and a small amount of sulfonated anisole, separating the organic phase from the acid phase by gravity separation, distilling the unreacted anisole from the organic phase whereby the product remains undistilled.

3. In a process for the manufacture of 2,2-bis-(4-methoxypyhenyl) - 1,1,1 - trichloroethane, the steps comprising mixing anisole and chloral in the proportions of about 3 to 5 moles of anisole for each mole of chloral, said anisole consisting in part of recycle anisole, cooling the anisole-chloral mixture to about 10 to 20° C. while simultaneously agitating the mixture, cooling to maintain its temperature to about 10 to 20° C. and gradually adding to it a total of 3 to 5 moles of about 95 to 98 per cent sulfuric acid for each mole of chloral, said sulfuric acid consisting of recycle sulfuric acid fortified with stronger sulfuric acid to give acid of said strength, whereby there is obtained at completion of the sulfuric acid addition a reaction mass composed of an organic phase consisting substantially of the product 2,2-bis-(4-methoxyphenyl)-1,1,1-trichloroethane and unused anisole and an acid phase consisting substantially of sulfuric acid, water, and a small amount of sulfonated anisole, separating the organic phase from the acid phase by gravity separation, returning a substantial portion of the acid phase as the aforementioned recycle sulfuric acid, washing the organic phase with water after separation from the acid, separating the organic phase from the wash water, passing steam into the washed organic phase whereby unused anisole in the organic phase is removed by steam distillation and the product remains undistilled, separating from water the anisole recovered in the steam distillation step and returning the recovered anisole as the aforementioned recycle anisole.

4. In a process for the manufacture of 2,2-bis-(4 - methoxyphenyl) - 1,1,1 - trichloroethane, the steps comprising mixing anisole, chloral, and about 95 to 98 per cent sulfuric acid in the proportions of at least 3 moles each of anisole and sulfuric acid for each mole of chloral to form a liquid reacting system while simultaneously agitating and cooling the system to maintain its temperature below about 20° C. whereby there is obtained at the completion of the mixing a reaction mass composed of an organic phase consisting substantially of the product 2,2-bis-(4-methoxyphenyl) - 1,1,1 - trichloroethane and unused anisole and an acid phase consisting substantially of sulfuric acid, water, and a small amount of sulfonated anisole, and recovering the product.

DAVID A. SHIRLEY.

REFERENCES CITED

The following references are of record in the file of this patent:

Elbs, "Journal Fur Praktische Chemie," vol. 47, page 68 (1893).

Fritsch et al., "Leibigs Annalen der Chemie," vol. 306, page 77 (1899).

Baeyer, "Berichte Deutsche Chemische Gesellschaft," vol. 5, page 1098 (1872).

Frankforter et al., "Jour. Am. Chem. Soc.," vol. 36 (1914), pages 1522, 1523.

DDT Report 44–2 (10 pages), Contract WPB–180, Office of Production Research and Development, War Production Board, dated June 17, 1944, Declassification authorized August 25, 1945.